(12) United States Patent
Win et al.

(10) Patent No.: US 11,516,655 B2
(45) Date of Patent: Nov. 29, 2022

(54) PHYSICAL LAYER KEY GENERATION

(71) Applicant: Massachusetts Institute of Technology, Cambridge, MA (US)

(72) Inventors: Moe Z. Win, Framingham, MA (US); Tianyi Peng, Somerville, MA (US); Wenhan Dai, Cambridge, MA (US); Zehao Yu, Cambridge, MA (US)

( * ) Notice: Subject to any disclaimer, the term of this patent is extended or adjusted under 35 U.S.C. 154(b) by 149 days.

(21) Appl. No.: 17/014,611

(22) Filed: Sep. 8, 2020

(65) Prior Publication Data
US 2021/0345102 A1 Nov. 4, 2021

Related U.S. Application Data

(60) Provisional application No. 62/933,913, filed on Nov. 11, 2019, provisional application No. 62/933,292, filed on Nov. 8, 2019.

(51) Int. Cl.
*H04W 12/03* (2021.01)
*H04L 9/08* (2006.01)

(52) U.S. Cl.
CPC .............. *H04W 12/03* (2021.01); *H04L 9/085* (2013.01); *H04L 9/0875* (2013.01)

(58) Field of Classification Search
None
See application file for complete search history.

(56) References Cited

U.S. PATENT DOCUMENTS

| 8,203,978 | B2 * | 6/2012 | Walton | H04B 7/0626 |
| | | | | 375/267 |
| 8,959,348 | B2 * | 2/2015 | Tsouri | H04L 9/0891 |
| | | | | 713/168 |
| 9,490,977 | B2 * | 11/2016 | Ye | H04L 9/0875 |
| 10,057,056 | B2 * | 8/2018 | Guillaume | H04W 12/041 |
| 10,111,091 | B2 | 10/2018 | Huth et al. | |
| 2007/0036353 | A1 * | 2/2007 | Reznik | H04L 63/0428 |
| | | | | 380/30 |

(Continued)

FOREIGN PATENT DOCUMENTS

| FR | 2995158 A1 | 3/2014 |
| WO | 2017163160 A1 | 9/2017 |
| WO | 2017189590 A1 | 11/2017 |

OTHER PUBLICATIONS

Kai. Zeng, "Physical layer key generation in wireless networks: challenges and opportunities," IEEE Communications lagazine, vol. 53, No. 6, pp. 33-39, 2015. (Year: 2015).*

(Continued)

*Primary Examiner* — Sanchit K Sarker
(74) *Attorney, Agent, or Firm* — Occhiuti & Rohlicek LLP

(57) ABSTRACT

Physical layer key generation provides privacy protection technique suitable for devices with limited computational ability. A key generation algorithm is based on OFDM waveforms. By exploiting the holistic CSI, key generation rate (KGR) is improved significantly. A cross-layer encryption protocol is based on the key generation algorithm and the AES. The secrecy of the encryption is enhanced compared to traditional encryption schemes with one pre-shared key (e.g., WPA2-PSK), even when some generated keys are leaked to the eavesdropper. The results lead to practical and robust applications of physical layer key generation.

11 Claims, 6 Drawing Sheets

(56) References Cited

U.S. PATENT DOCUMENTS

| | | | | |
|---|---|---|---|---|
| 2010/0313025 | A1* | 12/2010 | Tsouri | H04L 9/0891 713/171 |
| 2011/0280397 | A1 | 11/2011 | Patwar et al. | |
| 2018/0062841 | A1 | 3/2018 | Sahin et al. | |
| 2021/0028832 | A1* | 1/2021 | Liu | H04W 16/28 |
| 2021/0345102 | A1* | 11/2021 | Win | H04L 9/085 |

OTHER PUBLICATIONS

Patrick Van Torre "Key generation based on fast reciprocal channel estimation for body-worn sensor nodes" 11th European Conference on Antennas and Propagation (EUCAP), pp. 293-297, 2017 (Year: 2017).*

W. Diffie and M. Hellman, "New directions in cryptography," IEEE transactions onInformation Theory, vol. 22, No. 6, pp. 344-654, 1976.

K. Zeng, "Physical layer key generation in wireless networks: challenges and opportunities," IEEE Communications Magazine, vol. 53, No. 6, pp. 33-39, 2015.

Y. Shen and M. Z. Win, "Intrinsic information of wideband channels," IEEE J. Sel. AreasCommun., vol. 31, No. 9, pp. 1875-1888, Sep. 2013.

C. Ye, S. Mathur, A. Reznik, Y. Shah, W. Trappe, and N. B. Mandayam, "Information-theoretically secret key generation for fading wireless channels," IEEE Transactions on Information Forensics and Security, vol. 5, No. 2, pp. 240-254, Jun. 2010.

J. Zhang, A. Marshall, R. Woods, and T. Q. Duong, "Efficient key generation by exploiting randomness from channel responses of individual OFDM subcarriers," IEEE Transactions on Communications, vol. 64, No. 6, pp. 2578-2588, 2016.

J. Zhang, T. Q. Duong, A. Marshall, and R. Woods, "Key generation from wireless channels: A review," IEEE Access, vol. 4, pp. 614-626, 2016.

S. Jana, S. N. Premnath, M. Clark, S. K. Kasera, N. Patwari, and S. V. Krishnamurthy, "On the effectiveness of secret key extraction from wireless signal strength in real environments," in Proceedings of the 15th annual international conference on Mobile computing and networking. ACM, 2009, pp. 321-332.

H. Liu, Y. Wang, J. Yang, and Y. Chen, "Fast and practical secret key extraction by exploiting channel response," in INFOCOM, 2013 Proceedings IEEE. IEEE, 2013, pp. 3048-3056.

J. Zhang, R. Woods, A. Marshall, and T. Q. Duong, "Verification of key generation from individual ofdm subcarrier's channel response," in Globecom Workshops (GC Wkshps), 2015 IEEE. IEEE, 2015, pp. 1-6.

J. W. Wallace, C. Chen, and M. A. Jensen, "Key generation exploiting MIMO channel evolution: Algorithms and theoretical limits," in Antennas and Propagation, 2009. EuCAP 2009. 3rd European Conference on. IEEE, 2009, pp. 1499-1503.

M. G. Madiseh, S. W. Neville, and M. L. McGuire, "Time correlation analysis of secret key generation via UWB channels," in Global Telecommunications Conference (GLOBECOM 2010), 2010 IEEE. IEEE, 2010, pp. 1-6.

Y. Liu, S. C. Draper, and A. M. Sayeed, "Exploiting channel diversity in secret key generation from multipath fading randomness," IEEE Transactions on Information Forensics and Security, vol. 7, No. 5, pp. 1484-1497, Oct. 2012.

A. Tsitroulis, D. Lampoudis, and E. Tsekleves, "Exposing wpa2 security protocol vulnerabilities," International Journal of Information and Computer Security, vol. 6, No. 1, pp. 93-107, 2014.

L. Tierney, "Markov chains for exploring posterior distributions," the Annals of Statistics, pp. 1701-1728, 1994.

Aliabadian, A., M. R. Zahabi, and M. Mobini. "Optimal Singular Value Decomposition Based Pre-coding for Secret Key Extraction from Correlated Orthogonal Frequency Division Multiplexing Subchannels." International Journal of Engineering 33, No. 7 (2020): 1214-1222.

Wang, Tao, Yao Liu, and Athanasios V. Vasilakos. "Survey on channel reciprocity based key establishment techniques for wireless systems." Wireless Networks 21, No. 6 (2015): 1835-1846.

W. Dai, W. C. Lindsey, and M. Z. Win, "Accuracy of OFDM ranging systems in the presence of processing impairments," in Proc. IEEE Int. Conf. on Ubiquitous Wireless Broadband, Salamanca, Spain, Sep. 2017, pp. 1-6.

Y. Zhuo, H. Zhu, and H. Xue, "Identifying a new non-linear csi phase measurement error with commodity wifi devices," in 2016 IEEE 22nd International Conference on Parallel and Distributed Systems (ICPADS), Dec. 2016, pp. 72-79.

R. Melki, H. N. Noura, M. M. Mansour, and A. Chehab, "An efficient ofdm-based encryption scheme using a dynamic key approach," IEEE Internet of Things Journal, vol. 6, No. 1, pp. 361-378, 2019.

Cui Weirong et al., "PSP: Proximity-based secure pairing of mobile devices using WiFi Signals," Wireless Networs, vol. 25, No. 2, Sep. 26, 2014, pp. 733-751.

Manikanta Kotaru et al., "SpotFI: Decimeter Level Localization Using WiFi," Computer Communication Review, vol. 15, No. 4, Sep. 22, 2015, pp. 269-282.

* cited by examiner

PHYSICAL LAYER KEY GENERATION

CROSS-REFERENCE TO RELATED APPLICATIONS

This application claims the benefit of U.S. Provisional Applications No. 62/933,292, filed Nov. 8, 2019, and No. 62/933,913, filed Nov. 11, 2019, which are incorporated herein by reference.

FEDERAL SPONSORSHIP

This invention was made with government support under Grant No. N00014-16-1-2141 awarded by the Office of Naval Research and Grant No. N00014-17-1-2379 awarded by the Defense University Research Instrumentation Program. The government has certain rights in the invention.

PRIOR DISCLOSURES BY INVENTOR

Peng, Tianyi, Wenhan Dai, and Moe Z. Win. "Efficient and Robust Physical Layer Key Generation." In *MILCOM 2019-2019 IEEE Military Communications Conference (MILCOM)*, pp. 1-6. IEEE, 2019.

BACKGROUND

This application relates to cryptographic security between stations linked by a physical channel, and more particularly to encrypting and decrypting electronic communications exchange over the channel.

Wireless electronic communications have potential security vulnerabilities due to the fact that wireless signals can be easily intercepted. Thus, security protocols for encrypting wireless communications are popular. Such encryption protocols result in an intercepted message being unintelligible to an eavesdropper who lacks the ability to decrypt the message.

Some encryption protocols involve both the sender and the receiver using a previously-known, shared password to encrypt and decrypt communications. These protocols sometimes have the disadvantage of requiring a secure way for the sender and receiver to agree on the password in advance of a communication.

Other encryption protocols are "public key" protocols. Such protocols involve a sender and receiver generating two encryption keys: one public, and one private. A message can be encrypted or decrypted by anyone knowing one of the public keys and one of the private keys, but not by someone knowing only the public keys. Although these protocols do not require any prior secure communications, they are often computationally intensive. Depending on the capabilities of the electronic device being used to communicate, the computational intensity may mean communication may be undesirably slow, or may require an undesirably high amount of power.

Key generation from the physical layer of a channel, such as wireless radio frequency channels, linking communication nodes has attracted interest in recent years. Since multipath environments generally cause time-varying and location-sensitive fading effects on the wireless signals, the wireless channel parameters (e.g., path delays and path amplitudes) are regarded as a proper random source to generate secret keys. Specifically, due to the channel reciprocity, two legitimate nodes share the same channel parameters in any given time instance and can obtain highly correlated physical layer signals when they exchange information within a short time interval (the coherence time of the channel). Since it is difficult for a distant eavesdropper to guess the channel parameters between legitimate nodes, the keys extracted from these parameters can provide privacy protection for the later data transmission between legitimate devices.

Current physical-layer based cryptographic techniques nevertheless can suffer for limitations, for example, related to "leakage" of shared secret information such as when an adversary may, at least from time to time, be able to infer characteristics of a channel linking the legitimate nodes. Conversely, achieving desired levels of security using available physical-layer based algorithms may exceed to computational or power resources available at the nodes.

SUMMARY

The techniques described below involve efficient privacy protection technologies that provide enhanced security and/or are applicable to devices with limited computational ability or limited battery capacity.

The techniques described below involve using physical characteristics of the communication channel(s) between two devices (also referred to as "nodes" or "stations") to generate shared encryption keys. In some cases, these physical characteristics are captured in the phases of signals in the channel(s). In some cases, correlating the phase information between two devices involves determining only relative phases between two signals, eliminating the requirement for one or both devices to determine the absolute or ideal phase of a signal. Correlating the phases across two devices as described herein does not require sending or receiving any special-purpose signals (e.g., for calibration), thereby resulting in reduced transmission overhead.

The techniques described below further involve using the physical characteristics of the communication channel to continually update encryption keys based on changing characteristics of the communication channel. This provides an extra layer of security in the event the encryption becomes compromised at some moment. Thus, these techniques are particularly advantageous for channels carrying sensitive information (e.g., personally identifying information, financial information, etc.). Such channels include those used for mobile data (4G networks, 5G networks, etc.), WiFi networks, or others. Moreover, continual updating the encryption keys as described below avoids relatively complicated mathematical operations, thus making it attractive for low-processing or low-power systems. Such systems may include devices in an "internet of things" setting, such as connected appliances, smart speakers, connected vehicles, etc.

DETAILED DESCRIPTION

1 Overview

Figure 1:
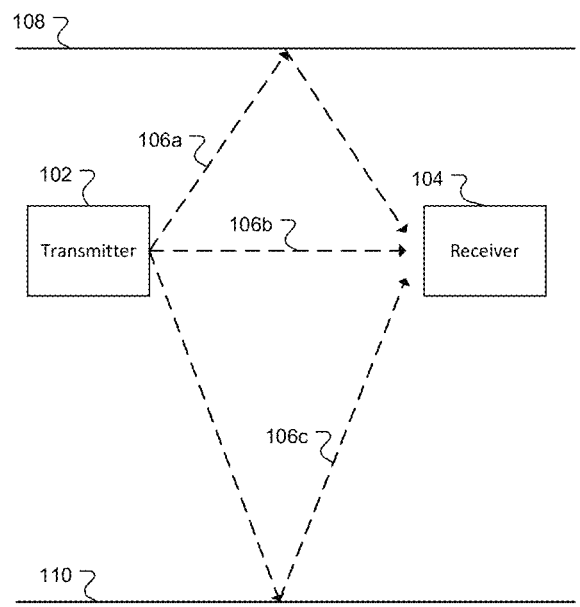
FIG. 1 is a schematic depiction of a multipath communication channel

Referring to FIG. 1, two nodes 102, 104 communicate over a wireless radio-frequency physical channel. The nodes communicate with one another over the same physical channel, and very generally, both use characteristics of that channel to general shared secret information, which they use for cryptographic tasks, such as encryption and decryption of communication between the nodes, typically passing over the same physical channel on which the the shared secret information (e.g., symmetric cryptographyic keys) were generated.

FIG. 1 shows one node 102 functioning as a transmitter and the other node 104 functioning as a receiver, and in the following discussion, node 102 is referred to as the transmitter and node 104 is referred to as the receiver. In discussion below describing operation at one node to generate a shared secret, it should be understood that the other node can perform the same operations to yield the same secret. This is because both nodes can determine characteristics of the channel joining the nodes under the principle of reciprocity that essentially says that characteristics of a radio channel (i.e., frequency-dependent magnitude and phase) for transmissions from a first node to a second node are the same (or can be determined from) transmissions from the second node to the first node.

The transmitter 102 transmits (i.e., emits or broadcasts) a wireless signal that may take several paths 106a, 106b, 106c to the receiver. Those paths may involve a direct, line-of-sight path (such as path 106a) from transmitter to receiver, or may reflect one or more times off one or more surfaces 108, 110 (such as paths 106b, 106c). Although not shown in FIG. 1A, further types of paths are possible, such as paths through non-uniform materials (e.g., passing through walls, windows, water, etc.) A communication channel having these characteristics is often referred to as a "multipath" communication channel.

Figure 2:
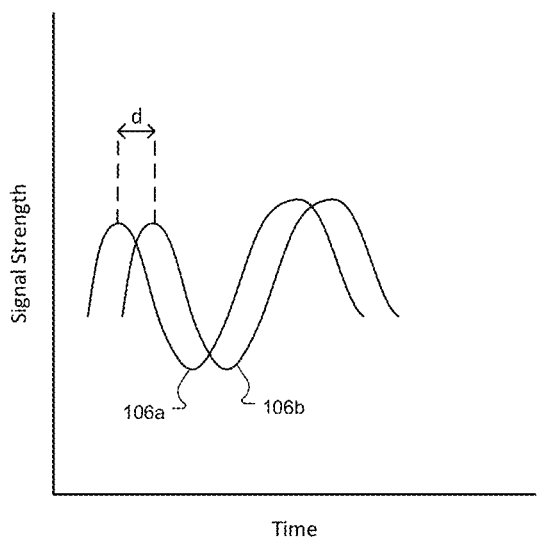
FIG. 2 is a plot of signal strength vs. time for two paths in the multipath channel of FIG. 1

FIG. 2 shows two exemplary signals that each correspond to a given path in a multipath communication channel; e.g., signals corresponding to paths 106a and 106b. As shown, the different time-of-flight for each path 106a, 106b results in a phase shift (shown in FIG. 2 as the distance d) between the two corresponding signals. Equivalently, the phase shift d encodes a characteristic of the communication channel; namely the time-of-flight difference for the two corresponding paths. More generally, the phase shifts among several signals, at several frequencies, received at several times, can collectively characterize a communication channel. Moreover, as the transmitter or receiver (or other elements defining an available signal propagation path) move or change, that movement or change may result in different phase characteristics compared to signals that were previously received.

2 Key Extraction from Channel State Information

In the section, we describe a physical layer key generation algorithm based on orthogonal frequency-division multiplexing (OFDM) waveforms. Although the description is in terms of OFDM modulation, the techniques described below may be applied to other modulation schemes, such as Code Division Multiple Access ("CMDA") or the like.

2.1 Signal Error Model

Define a quantity h(f) by $$h(f) = \sum_{l=1}^{L} \alpha_l e^{-j2\pi f \tau_l}$$

where L denotes the number of paths in a multipath channel, $\alpha_l$ and $\tau_l$ denote the amplitude and delay of the lth path, respectively, and $j^2 = -1$. This quantity depends on the state of the communication channel. For example, both $\alpha_l$ and $\tau_l$ is, in general, a function of the relative position of the transmitter and receiver, as well as a function of any obstructions or non-homogeneous signal propagation media in the vicinity of the transmitter or receiver. As such, these quantities (and the quantity h(f)) are examples of "channel state information." Channel state information, in general, refers to information that partially or completely characterizes a channel that can be recovered from signals propagating through the channel. "Phase-related channel state information" refers to such information that can be recovered from the phases of signals propagating through the channel.

When a signal packet is received, the values of h(f) at different subcarriers are, ideally, reportable at the same time. Specifically, suppose the central carrier frequency of the receiver is $f_c$. The frequency of kth subcarrier is given by $f_k = f_c + k \cdot \Delta_f$, where $\Delta_f$ is the frequency difference between two subcarriers. In some implementations, for each package sent by an INTEL 5300 WiFi card, the receiver ideally provides samples at 56 different subcarriers (a subset S of subcarriers indexed from −28 to 28), i.e., $$h(f_k) = \sum_{l=1}^{L} \alpha_l e^{-j2\pi f \tau_l}, k \in S$$

where S is the subset of subcarriers that reports the specified channel state information. However, due to various processing impairments and environment noise, the channel state information received by a receiver is often different from the ideal quantity described above.

One model of processing impairments and environmental noise is given in [12]. Let the actually-received channel state information be denoted $\tilde{h}(f_k)$. This can be modeled to deviate from the ideal channel state information h(f) by:

$$\tilde{h}(f_k) = (|h(f_k)| n_a^k) e^{j(\angle h(f_k) + k \cdot (\lambda_b + \lambda_o) + \beta + n_p^k)}$$

where $\angle h(f_k)$ and $|h(f_k)|$ denote the phase and amplitude of the ideal CSI $h(f_k)$ respectively, $\lambda_b$ denotes the phase offset induced by the packet detection delay, $\lambda_o$ denotes the sampling frequency offset, $\beta$ denotes the central frequency offset, $n_a^k \sim N(0, \sigma_a)$ and $n_p^k \sim N(0, \sigma_p)$ denote independent and identically distributed (i.i.d.) Gaussian noise with zero mean and a fixed variance for the amplitude and phase respectively.

2.2 Phase Error Mitigation

To extract keys from the phase information, we first describe a technique ("Phase Error Mitigation," or "PEM") to mitigate the phase error of received signals caused by processing impairments. Generally speaking, the PEM approach involves correlating the phases of received signals between the sender and receiver, so that the correlated phase information can be used by either device with an expectation it will be consistent with the other device.

To correlate the channel state information received by two nodes in communication across the channel, error mitigation can be applied to the amplitude and phase separately. Amplitude correlation can be increased by averaging the signals in the coherence time (i.e., the maximum time during which the channel state information remains constant). In some implementations, the channel coherence time is 200 ms. Amplitude correlation may also be increased by employing the channel gain complement approach introduced in [8].

However, it is known that the true phase of received signals is hard to directly obtain due to processing impairments [6]. Nevertheless, the techniques described below do not require knowing or estimating the true phase. Instead, it suffices for the phases of signals at two nodes in communication over the channel be correlated, even if the correlated values differ significantly from the true values. This correlation can be achieved by performing a phase error mitigation technique, as follows:

Consider the phase of the received phase-related channel state information at frequency $f_k$, given by:

$$\angle \tilde{h}(f_k) = \angle h(f_k) + k \cdot (\lambda_b + \lambda_o) + \beta + n_p^k.$$

Let $\overline{\angle h}$ denote the mean of $\angle \tilde{h}(f_k)$, i.e., $\overline{\angle h} = \Sigma_{k \in S} \angle \tilde{h}(f_k)/|S|$. Then, each element $\angle \tilde{h}(f_k)$ of the collection $\{\angle \tilde{h}(f_k) | k \in S\}$ can be approximately split into a linear term:

$k \cdot (\lambda_b + \lambda_o) + \beta + \overline{\angle h}$ (with the slope $\lambda_b + \lambda_o$ and the intercept $\beta + \overline{\angle h}$) and the non-linear term $\angle h(f_k) - \overline{\angle h} + n_p^k$. Note that the expectation of the non-linear term is zero, since $$\mathbb{E}\left\{\frac{1}{|S|}\sum_{k \in S}(\angle h(f_k) - \overline{\angle h} + n_p^k)\right\} =$$

$$\mathbb{E}\left\{\frac{1}{|S|}\sum_{k \in S}(\angle h(f_k) - \overline{\angle h})\right\} + \frac{1}{|S|}\sum_{k \in S}\mathbb{E}\{n_p^k\} = 0.$$

Treating the non-linear term as the zero-mean noise, we can use the least square method to find a straight line to approximate phase vectors (corrected by adding $+2\pi$). After subtracting the linear term, the remaining phase (non-linear term) is $$\angle h(f_k) - \overline{\angle h} + n_p^k.$$

Figure 3:
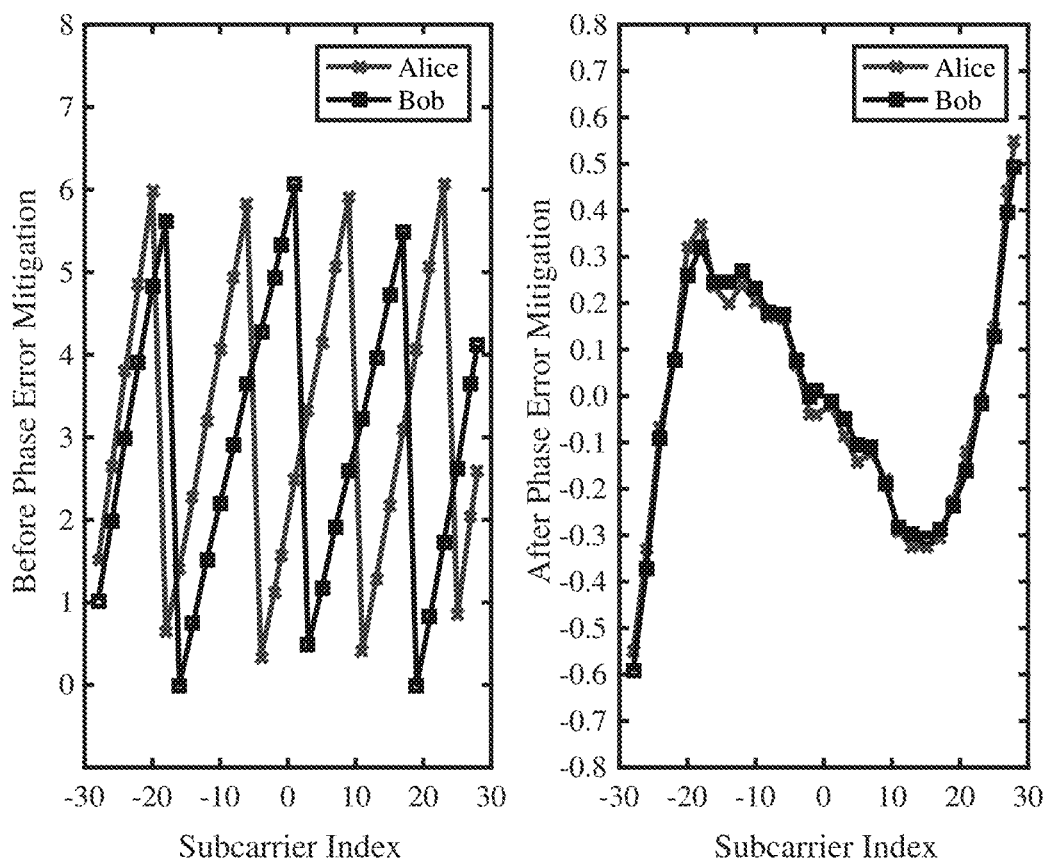
FIG. 3 is a pair of graphs showing how PEM improves the phase correlation of the impaired CSI.

Note that the processing impairment parameters $\lambda_b$, $\lambda_o$, and $\beta$ have been eliminated. Thus, when this calculation is performed on different devices, the results are in substantial agreement despite the devices potentially having different processing impairment parameters. (In this context, "substantial" agreement means that the disagreement, if any, between correlated phases is not so great as to prevent desired key generation and/or key disagreement rates, as described more fully below) FIG. 3 shows the effect of the phase error mitigation. The left subfigure is the actually-received phase by two nodes in a period of coherence time. The right subfigure is the phase after each node performs the phase error mitigation independently. Thus, the PEM procedure, when carried out independently on either the sender or receiver, is operable correlate the received phases at both the sender and the receiver. Correlating the phases in this way produces correlated phases (or relative phases) that need not equal, or even approximate, the true phase of the received signal. Instead, correlating the phases across the sender and receiver simply produces consistent phase information, without any requirements on accuracy.

2.3 Key Extraction

Unless otherwise stated, in this section we assume that channel state information is encoded in a signal that is amplitude-correlated and phase-correlated between transmitter and receiver. In some implementations, this may be achieved, in part, using the phase error mitigation techniques described above or by other techniques. In some implementations, the phase and/or amplitude of the PEM-processed signal may be further averaged over multiple packages received within coherence time.

If such a signal is analog, key extraction begins by converting the analog signal to a digital signal. To that end, we implement a quantization scheme for transforming the complex values to binary values for key generation. Similarly to the quantization scheme in [14] for complex numbers, we employ the quantization for the real part and image part of the input signal separately.

By way of illustration, let $r_t(f)$ be the real part of the channel state information-bearing signal received at frequency f and time $t_i$. (The complex part of the signal may be processed similarly.) Given N samples $r_1(f), r_2(f), \ldots, r_N(f)$ with a pre-fixed N, the quantization process can be applied according to the cumulative distribution function, or cumulative distribution function (CDF), of the given signals. For a quantization level n, the quantization level $Q(x) \in \{0, \ldots, n-1\}$ of x, is defined such that $$Q(x) = k \text{ if } \frac{k}{n} \leq F^{-1}(x) < \frac{k+1}{n}$$

where F(x) is the CDF of $r_1(f), r_2(f), \ldots, r_N(f)$. In some implementations, after the quantization, further traditional processing such as Grey coding, information conciliation, and privacy amplification can be used to obtain the final key.

In some implementations, a quantization level can be adaptively determined according to the specific environment to balance the trade off between two considerations: the key generation rate (or "KGR"; i.e., the speed with which keys are generated and/or updated) and the key disagreement rate (or "KDR"; i.e., the likelihood that keys independently generated by two different nodes disagree, resulting in the nodes' inability to decrypt signals sent between them). Although it is typically desirable for a high KGR and low KDR, both KDR and KDR tend to be increasing functions of the quantization level. Thus, in some implementations, the quantization level can be dynamically determined to implement a minimum KGR, a maximum KDR, mean KGR or KDR, or to achieve some other constraint involving KGR and/or KDR.

2.4 Experiments and Results

The proposed key extraction algorithm is adopted in an experiment, in which two laptops equipped with INTEL 5300 WiFi cards are used. The packages are transmitted in the channel with central frequency 5180 MHZ. After receiving a package, the channel state information (CSI) of 30 subcarriers with timestamps is obtained. During the coherence time (approximately 200 ms), two laptops exchange 20 packages and then we implement the PEM scheme and average the phase and amplitude. In total, 1800 packages are exchanged. In the experiment, two laptops move with the speed around 1~2 m/s in an indoor environment, while the distance between them is kept around 3 meters.

Figure 4:
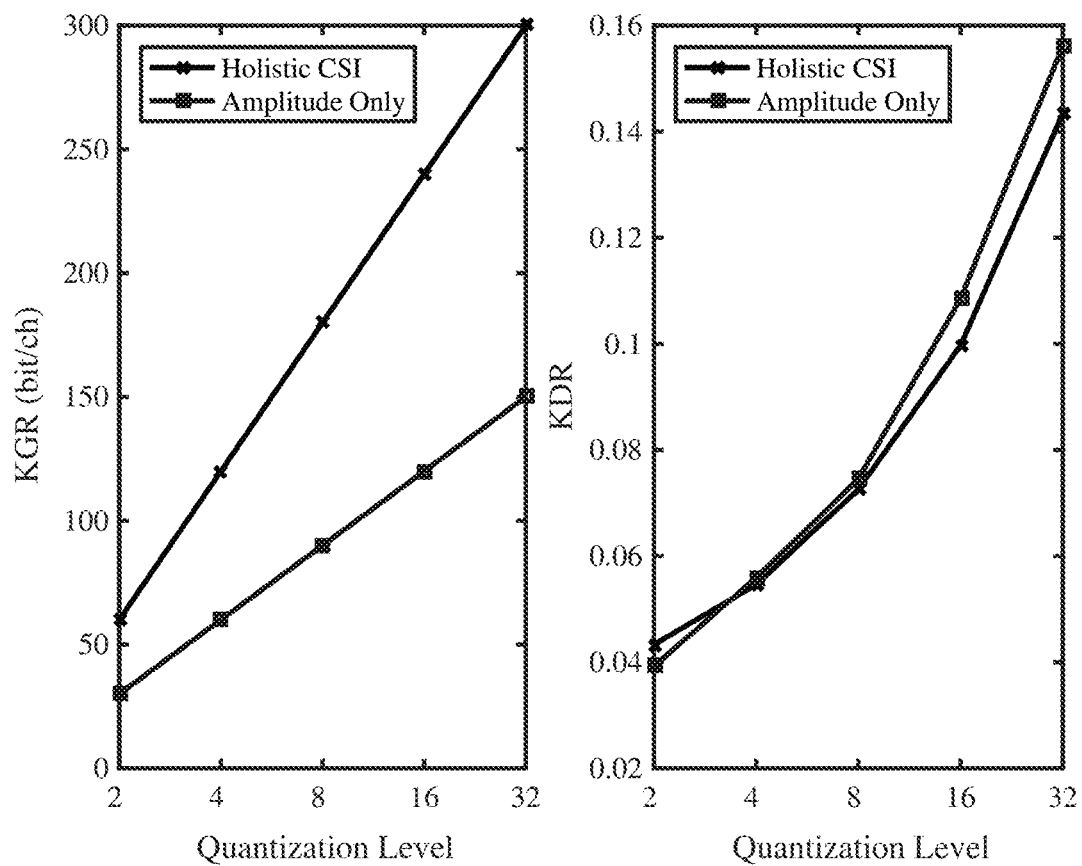
FIG. 4 is a pair of graphs shown KGR (key generation rate) and KDR (key disagreement rate) results for the key generation experiment showing five quantization levels.

After collecting the data, different quantization levels (n=2, 4, 8, 16, 32) with N=90 (the number of CSI samples for estimating the CDF) have been tested. For comparison, we also use the amplitude of the CSI to generate keys with the same quantization method. The results are shown in FIG. 4. The left subfigure shows the KGR (bit per coherence time). The right subfigure shows the average KDR after Grey coding. Higher quantization level will increase both the KGR and the KDR, which leads to a KGR-KDR tradeoff. The results show that our algorithm provides nearly twice KGR and a similar KDR by improving the phase correlation and exploiting the holistic CSI information, compared to the method using only the amplitude information [8].

2.5 Passive Adversary Experiment

When two nodes transmit packages, an eavesdropper can passively listen to the channel and make channel measurements between itself and either of the two nodes. The leaked information provides a possibility for the eavesdropper to guess the generated keys and therefore poses a secrecy risk. To investigate this secrecy issue brought by the passive adversary, we follow the setting in the above experiment and let a third laptop collect the transmissions sent by the transmitter. For clarity, we refer to the three nodes as A (for "Alice"), B (for "Bob"), and E (for "eavesdropper"). In this experiment, B transmits an encrypted message with A as the intended receiver, and E as an eavesdropper.

Figure 5:
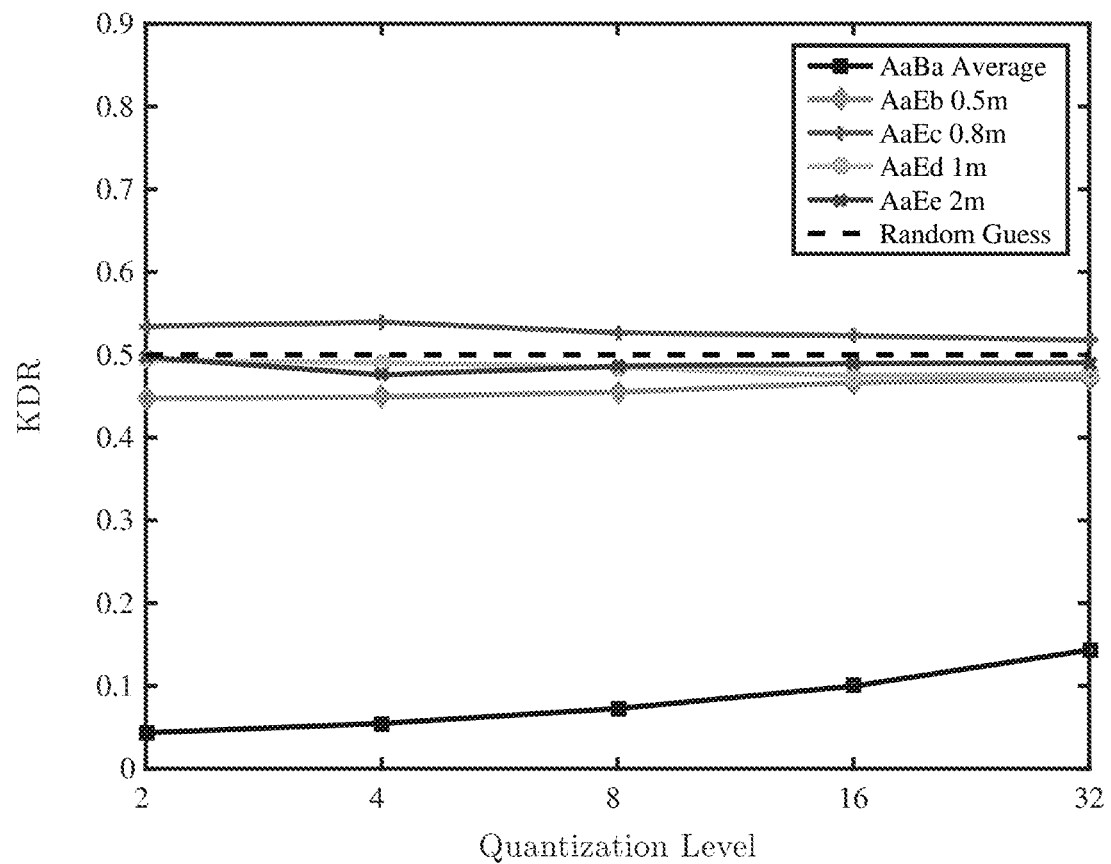
FIG. 5 is a graph of KDR results for the passive adversary experiment.

The distance between the intended receiver and the eavesdropper varies from 0.5 m to 2 m. All nodes perform the same key extraction process to obtain the keys (including phase error mitigation and quantization processes, and Grey coding, as described above). Then the key disagreement rate between keys obtained by the intended receiver and the eavesdropper is evaluated. For comparison, we also plot the average key disagreement rate between A (B→A) and B (A→B). The results are shown in FIG. 5. Note that if the eavesdropper obtains no information about the key, the random guess strategy (i.e., guessing each bit from a uniform distribution) can be used to achieve a key disagreement rate of 0.5 per bit. From FIG. 5, the key disagreement rate between Eve's signals and legitimate nodes' signals is approximately 0.5 per bit (for various distances), indicating that eavesdropping does not provide a significant advantage over random guessing.

2.6 Advanced Encryption Standard (AES) Counter Mode

Advanced Encryption Standard, or "AES" is a symmetric block cipher widely used in many protocols such as WiFi and SSL/TLS. One of the most common modes to utilize AES for encrypting data is the counter mode. In particular, the encryption is based on some bit string k with length |k| (e.g., |k|=128), shared by a sender and receiver. To send plaintext m with length |m|, the protocol first divides m into a conjunction of |k|-bit length blocks:

$$m = m_1, m_2, \ldots m_{\lceil m \rceil / |k|}.$$

Then, the transmitter generates a random |k|-bit string ctr to send to the receiver. Here, ctr is used as a counter. When the sender prepares to send plaintext $m_1$, she encrypts it and sends ciphertext $c_j$, with $c_j$ determined as follows:

$$c_j = m_j \oplus AES_k(ctr + j)$$

where $AES_k(\cdot)$ is some pseudo-random function based on key k and $\oplus$ is the bitwise XOR operation. Given ciphertext $c_j$, the receiver can use a similar process to recover the plaintext m by setting:

$$m_j = c_j \oplus AES_k(ctr + j).$$

If an eavesdropper does not know k, and $AES_k(\cdot)$ behaves like a random function, it is hard for the eavesdropper to guess $AES_k(ctr+1), AES_k(ctr+2), \ldots$, even with the knowledge about ctr. Therefore, it is difficult for the eavesdropper to obtain the information about plaintexts by observing ciphertexts. However, since one key is repeatedly used to encrypt plaintexts, if the key is leaked, all plaintexts will be exposed.

2.7 Cross-Layer Encryption Protocol with Unstable Key Generator

Frequently updating keys in the AES paradigm reduces the amount of data leaked by a single, compromised key in AES. The techniques describe below provide ways to update keys. Some of these techniques involve an "unstable key generator," or "UKG." This key generator is unstable in the sense that the ability to reconstruct updated keys based on prior keys decays exponentially, as described below.

We refer to the ith key for AES as the encryption key $k_i^{enc}$, and the ith key generated from the unstable key generator described above as the "raw key" $k_i^{raw}$. A simple but insecure approach to update the encryption key is to assign the contents of ith raw key to the ith encryption key directly, i.e., when the raw key $k_i^{raw}$ is generated from Unstable Key Generator (UKG) at $t_i^k$, let $k_i^{enc} = k_i^{raw}$. However, since the secrecy level of generated keys from UKG is unstable, sometimes the eavesdropper may have the partial information about the raw key, making this encryption scheme less secure.

To address this issue, we introduce the cross-layer design by combining a recently-computed raw key and the old encryption key together to obtain the new encryption key using XOR: $k_i^{enc} := k_{i-1}^{enc} \oplus k_i^{raw}$. Then in the case that $k_i^{raw}$ has a low secrecy level (e.g., in a scenario in which the eavesdropper can intercept a communication from substantially the same communication channel), an eavesdropper still does not know the new encryption key without additional knowledge of the old encryption key. That is, the new encryption key combines the eavesdropper's uncertainty of $k_i^{raw}$ and $k_{i-1}^{enc}$.

The cross-layer protocol for a sender is shown in Algorithm 1. The receiver's protocol is similar to the sender's. That is, the ciphertext may be decrypted using the equation:

$$m_j = c_j \oplus AES_{k_i^{enc}}(ctr + j).$$

Compared to some known dynamic key updating protocols [15], this protocol combines the uncertainty of channel information generated from different time and hence provide another layer of secrecy.

---

Algorithm 1 Cross-Layer Data Encryption

Variables: encryption key $k_i^{enc}$, counter ctr
while true do
  if $k_i^{raw}$ is generated from the UKG then
    $k_i^{enc} := k_{i-1}^{enc} \oplus k_i^{raw}$;
  end if
  if plaintext $m_j$ needs to be sent to receiver then
    encrypt the plaintext: $c_j = m_j \oplus AES_{k_i^{enc}}(ctr + j)$;
    send $c_j$ to receiver;
  end if
end while

---

Figure 6:
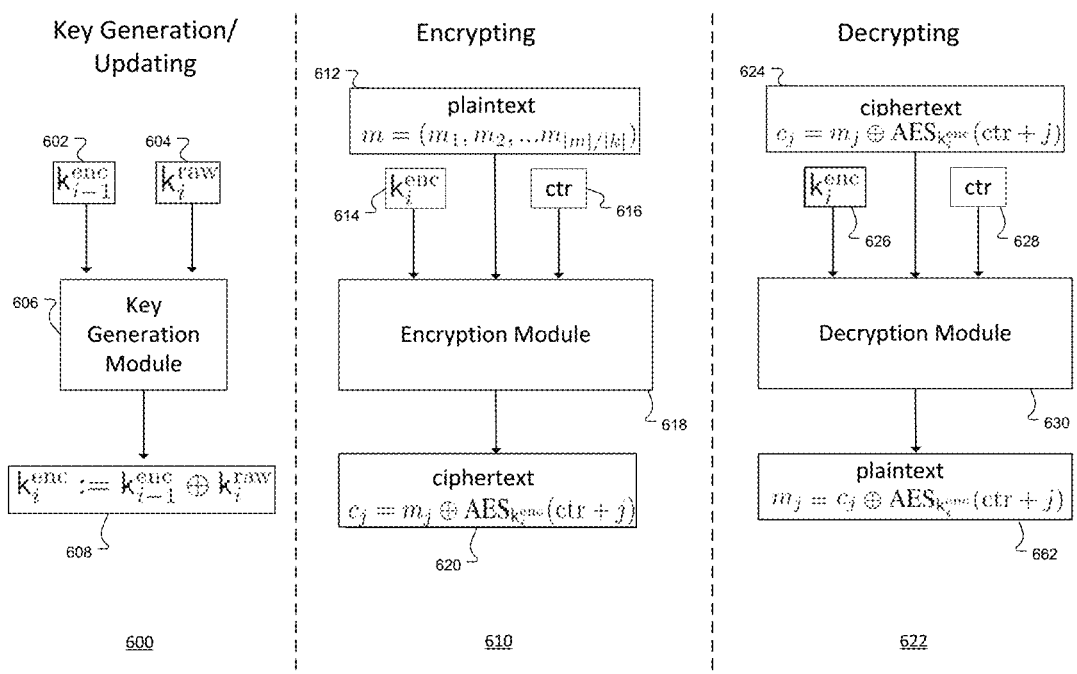
FIG. 6 is a flow diagram of key generation, encryption, and decryption.

This algorithm is further illustrated in reference to FIG. 6, which includes three phases: key generation 600, encrypting 610 and decrypting 622. In some implementations, both a transmitting device and a receiving device perform the key generation steps 600, a transmitting device performs the encryption steps 610, and the receiving device performs the decrypting steps 622.

During key generation 600, a key generation module 606 takes as input a previous encryption key 602 and a current key derived from currently correlated phase-related channel state information 604. The current key may include, but need not be limited to, the quantity $k_i^{raw}$; in general any key derived from current phase-related channel state information that is correlated between sender and receiver may be used.

The key generation module 606 combines the two keys 602 and 604 to produce a current encryption key 608.

During the encrypting phase 610, an encryption module 618 receives as input a plaintext message 612, as well as a current encryption key 614 and a counter value 616. The encryption module 618 then encrypts the plaintext to produce ciphertext 620 as described above. The ciphertext may be transmitted by the transmitting device.

During the decryption phase 622, a decryption module 630 receives as input ciphertext 624, a current encryption key 626, and a counter value 628. The decryption module 230 then decrypts the ciphertext 624 to produce plaintext 632, as described above.

The modules 606, 618, and 630 can be implemented as software, hardware, or a combination of software and hardware.

2.8 Security Model and Analysis

Intuitively, frequent key updating can have the following advantages: (i) reduce the probability that a key is cracked; (ii) in case that a key is cracked, limit the amount of leaked information. In this section, we provide an analysis to show how the amount of leaked information is upper bounded in our cross-layer protocol. Suppose the plaintext encryption process is a Poisson process $\{\pi(t), t \geq 0\}$ with rate $\mu$. The ith plaintext $m_i$ is encrypted at the time $t_i^m = \inf\{t | \pi(t) \geq i\}$.

Consider an encryption protocol which uses encryption keys $k_1^{enc}, k_2^{enc}, \ldots$ to encrypt plaintexts. Let $c_i$ be the maximal number of leaked plaintexts after $k_i^{enc}$ is cracked ($c_i$ is a random number depends on the random process). Denote the average portion of encryption keys that have $c_i > R$ by $$h(R) = \lim_{N \to \infty} \frac{1}{N} \sum_{j=1}^{N} \mathbb{I} c_i > R$$

where $\mathbb{I}$ is the indicator function. The convergence is proved in the Appendix I. Intuitively, h(R) can be interpreted as the outage probability: with probability h(R), a leaked encryption key leads to more than R leaked plaintexts.

In practice, every key may be cracked by the eavesdropper (e.g., by hacking the upper layer device). It is desirable that less plaintexts are leaked after some key is cracked.

To capture this property, we use $o_i$ to indicate whether key $k_i^{enc}$ is "overused": $o_i = 1$ if more than R (a preset security threshold) plaintexts can be leaked in the worst case after the eavesdropper cracks $k_i^{enc}$; otherwise $o_i = 0$. Then we define the overused ratio of an encryption protocol corresponding to the ratio of overused keys:

$$S_R := \lim_{N \to \infty} \frac{1}{N} \sum_{i=1}^{N} o_i. \quad (1)$$

Intuitively, a lower overused ratio $S_R$ indicates that the portion of overused keys is smaller, hence the encryption protocol is more secure.

For example, consider a traditional encryption protocol with a single key ($k_1^{enc} = k_2^{enc} = \ldots$). Since the eavesdropper knows all the ciphertexts, cracking one key will leak all the plaintexts. Hence $h(R) = 1$ for any finite R. Next, we provide an analysis of h(R) for our cross-layer protocol. In particular, suppose $k_i^{enc}$ generated at time $t_i^k$ is cracked by Eve. Denote $l_i, r_i$ by $l_i = \max(\{j | q_j = 1, j \leq i\} \cup \{0\})$, $r_i = \min\{j | q_j = 1, j > i\}$.

intuitively, $k_{l_i}^{raw}$ is the latest raw key that is unknown to the eavesdropper before time $t_i^k$, $k_{r_i}^{raw}$ is the first raw key that is unknown to the eavesdropper after $t_i^k$. In the worst case, $k_{l_i+1}^{raw}, k_{l_i+2}^{raw}, \ldots, k_{r_i-1}^{raw}$ is known to Eve. Meanwhile, by iterating the equation $k_j^{enc} = k_{j-1}^{enc} \oplus k_j^{raw}$, it is easy to obtain $k_j^{enc} = k_i^{enc} \oplus k_{i+1}^{raw} \oplus \ldots \oplus k_j^{raw} (j \geq 1)$, $k_j^{enc} = k_i^{enc} \oplus k_{i-1}^{raw} \oplus \ldots \oplus k_{j+1}^{raw} (j < 1)$.

Hence $k_{l_i}^{enc}, k_{l_i+1}^{enc}, \ldots$ and $k_{r_i-1}^{enc}$ are known to the eavesdropper in the worst case. If the encryption key is known to Eve, all plaintexts that are encrypted by this key will also be known to Eve. Then the maximal number of total leaked plaintexts is $$c_i = -|\{m_j | t_{l_i}^k \leq t_{r_i}^k\}|.$$

Recall that $\lambda$ is the rate of key generation process of UKG, p is the probability of outputting a key that is totally unknown to Eve, and/I is the rate of plaintext encryption process. Then Theorem 1 the Cross-Layer Protocol has the Following Outage Probability:

$$h(R) = \left(\frac{\mu}{\mu + \lambda p}\right)^{R+1} \left(1 + (1-p)(R+1)\frac{\lambda p}{\lambda p + \mu}\right).$$

Figure 7:
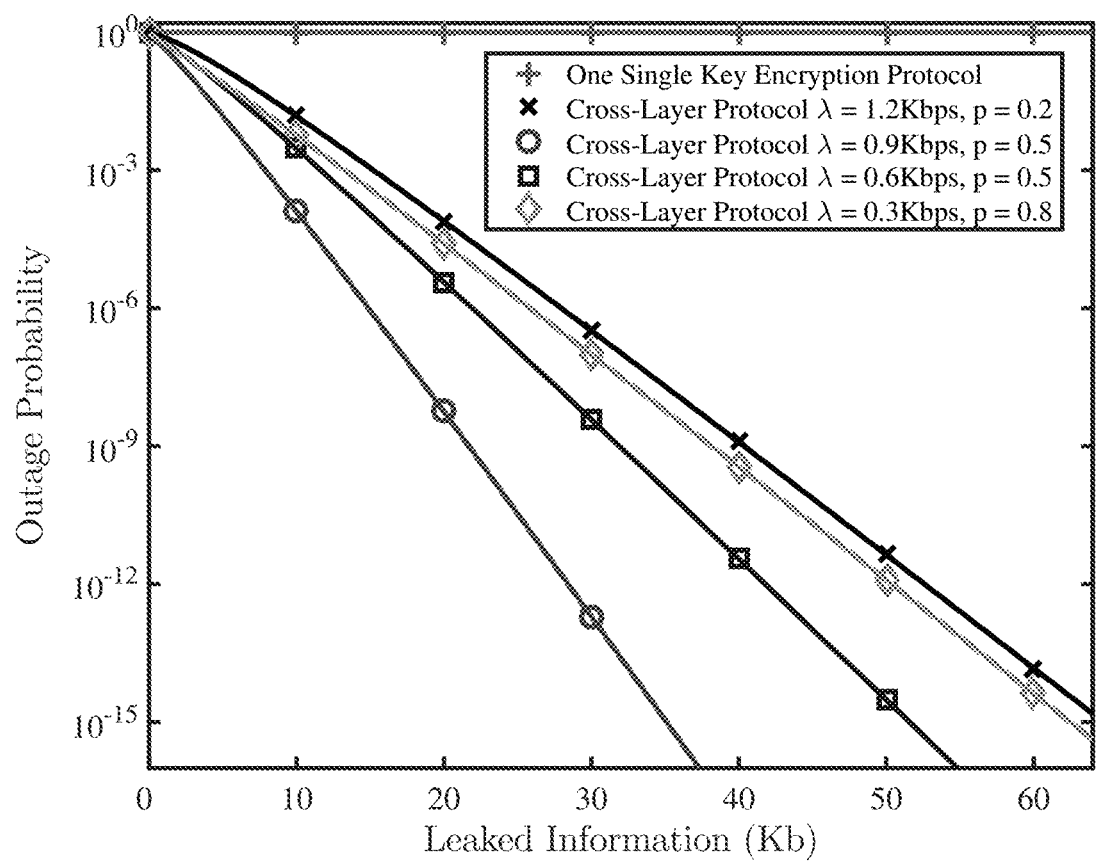
FIG. 7 is a graph illustrating a relation between the leaked information and the outage probability for different settings ($\mu$=1 GB/month for all settings).

This theorem demonstrates an exponential decrease of the outage probability corresponding to R. See FIG. 7 for examples with different parameters (suppose the length of the AES key is 128 bit). To see the improvement brought by our protocol, consider Wi-Fi Protected Access 2 with pre-shared keys (WPA2-PSK), a widely used wireless encryption protocol. If the pre-shared key is cracked (e.g., WiFi password), then all plaintexts will be leaked in the worst case (i.e., h(R)=1) [16]. Comparatively, using the protocols described herein, consider the secret key generation rate is $\lambda$=0.6 Kbps (corresponding to quantization level n=4 for our algorithm in 2.4 and coherence time 200 ms), p=0.5, and data traffic rate is $\mu$=1 GB/month (a typical number for a mobile phone). Then only $10^{-11.91}$ percentage of encryption keys will lead to more than 40 Kb amount of leaked information. If an audio file with 128 Kbps bit rate is transmitted, 40 Kb of leaked data corresponds to only ⅓ seconds of playing time. Practically, the implementation of these protocols does not need to know the exact parameters for $\lambda$, p, $\mu$ and R, and the secrecy of the encryption is nevertheless improved.

3 Implementations and Alternatives

The description above relates primarily to communication between two parties over free-space radio-frequency physical communication channels. But it should be realized that other types of communication channels may be used, for example, acoustic or optical channels may be used, and communication may be over media, such as electrical cables or optical fibers. Furthermore, a group of more than two nodes can establish pairwise secrets used in cryptographic functions involving more than two nodes. Yet other modifications of the specific embodiments described above can be made without deviating from the general approach.

The approaches described above may be implemented in software, or in hardware, or a combination of hardware and software. The software may include instructions stored on a non-transitory machine-readable medium, and when executed on a general-purpose or a special-purpose processor implements some or all of the steps summarized above. The hardware may include Application-Specific Integrated Circuits (ASICs), Field Programmable Gate Arrays (FPGAs), and the like. The hardware may further include WiFi-equipped devices such as WiFi cards, chips, etc. The hardware may further any components capable of wireless communication, e.g. those embedded in mobile devices, "smart" appliances, switches, vehicles, measurement instruments, or the like. The hardware may be represented in a design structure. For example, the design structure comprises a computer accessible non-transitory storage medium that includes a database representative of some or all of the components of a system embodying the steps summarized above. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist (with or without the synthesis library) or the data set.

One or more embodiments described in this document are within the scope of the appended claims.

REFERENCES

[1] W. Diffie and M. Hellman, "New directions in cryptography," *IEEE transactions on Information Theory*, vol. 22, no. 6, pp. 644-654, 1976.

[2] K. Zeng, "Physical layer key generation in wireless networks: challenges and opportunities," *IEEE Communications Magazine*, vol. 53, no. 6, pp. 33-39, 2015.

[3] Y. Shen and M. Z. Win, "Intrinsic information of wideband channels," *IEEE J. Sel. Areas Commun.*, vol. 31, no. 9, pp. 1875-1888, September 2013.

[4] C. Ye, S. Mathur, A. Reznik, Y. Shah, W. Trappe, and N. B. Mandayam, "Information-theoretically secret key generation for fading wireless channels," *IEEE Transactions on Information Forensics and Security*, vol. 5, no. 2, pp. 240-254, June 2010.

[5] J. Zhang, A. Marshall, R. Woods, and T. Q. Duong, "Efficient key generation by exploiting randomness from channel responses of individual ofdm subcarriers," *IEEE Transactions on Communications*, vol. 64, no. 6, pp. 2578-2588, 2016.

[6] J. Zhang, T. Q. Duong, A. Marshall, and R. Woods, "Key generation from wireless channels: A review," *IEEE Access*, vol. 4, pp. 614-626, 2016.

[7] S. Jana, S. N. Premnath, M. Clark, S. K. Kasera, N. Patwari, and S. V. Krishnamurthy, "On the effectiveness of secret key extraction from wireless signal strength in real environments," in *Proceedings of the 15th annual international conference on Mobile computing and networking*. ACM, 2009, pp. 321-332.

[8] H. Liu, Y. Wang, J. Yang, and Y. Chen, "Fast and practical secret key extraction by exploiting channel response," in *INFOCOM, 2013 Proceedings IEEE*. IEEE, 2013, pp. 3048-3056.

[9] J. Zhang, R. Woods, A. Marshall, and T. Q. Duong, "Verification of key generation from individual ofdm subcarrier's channel response," in *Globecom Workshops (GC Wkshps), 2015 IEEE*. IEEE, 2015, pp. 1-6.

[10] J. W. Wallace, C. Chen, and M. A. Jensen, "Key generation exploiting mimo channel evolution: Algorithms and theoretical limits," in *Antennas and Propagation, 2009. EuCAP 2009. 3rd European Conference on*. IEEE, 2009, pp. 1499-1503.

[11] M. G. Madiseh, S. W. Neville, and M. L. McGuire, "Time correlation analysis of secret key generation via uwb channels," in *Global Telecommunications Conference (GLOBECOM 2010), 2010 IEEE*. IEEE, 2010, pp. 1-6.

[12] W. Dai, W. C. Lindsey, and M. Z. Win, "Accuracy of OFDM ranging systems in the presence of processing impairments," in *Proc. IEEE Int. Conf. on Ubiquitous Wireless Broadband*, Salamanca, Spain, September 2017, pp. 1-6.

[13] Y. Zhuo, H. Zhu, and H. Xue, "Identifying a new non-linear csi phase measurement error with commodity wifi devices," in *2016 IEEE 22nd International Conference on Parallel and Distributed Systems (ICPADS)*, December 2016, pp. 72-79.

[14] Y. Liu, S. C. Draper, and A. M. Sayeed, "Exploiting channel diversity in secret key generation from multipath fading randomness," *IEEE Transactions on Information Forensics and Security*, vol. 7, no. 5, pp. 1484-1497, October 2012.

[15] R. Melki, H. N. Noura, M. M. Mansour, and A. Chehab, "An efficient ofdm-based encryption scheme using a dynamic key approach," *IEEE Internet of Things Journal*, vol. 6, no. 1, pp. 361-378, 2019.

[16] A. Tsitroulis, D. Lampoudis, and E. Tsekleves, "Exposing wpa2 security protocol vulnerabilities," *International Journal of Information and Computer Security*, vol. 6, no. 1, pp. 93-107, 2014.

[17] L. Tierney, "Markov chains for exploring posterior distributions," the *Annals of Statistics*, pp. 1701-1728, 1994.

APPENDIX: PROOF OF THEOREM 1

Proof 1 The proof idea is based on the Markov chain. Denote the current time by t. Let $k_1^{enc}$ be the latest encryption key unknown to the eavesdropper before t, where $l=\max(\{j|q_j=1, t_j^k \leq t\} \cup \{0\})$. Let A be the set of encryption keys that are generated during the interval $[t_l^k]$, B be the set of plaintext that are encrypted during the interval $[t_l^k, t]$. We can construct a Markov chain characterized by the state space $\{S_{x,y} | x, y \geq 0\} \cup \{S^*\}$, where $S_{x,y}$ represents the state in which $|A|=x$, $|B|=y$, and $S^*$ represents the state that a new raw key unknown to the eavesdropper is generated. Consider an infinitesimal time interval $\delta$, the transition probability is $\mathbb{P}\{S_{x,y+1} | S_{x,y}\} = \mu\delta$, $\mathbb{P}\{S_{x+1,y} | S_{x,y}\} = \lambda(1-p)\delta$ $\mathbb{P}\{S_{x,y} | S_{x,y}\} = 1 - \mu\delta - \lambda\delta$, $\mathbb{P}\{S^* | S_{x,y}\} = \lambda p \delta$ $\mathbb{P}\{S_{1,1} | S^*\} = \mu\delta$, $\mathbb{P}\{S_{2,0} | S^*\} = \lambda(1-p)\delta$ $\mathbb{P}\{S_{1,0} | S^*\} = 1 - \mu\delta - \lambda\delta$, $\mathbb{P}\{S^* | S^*\} = \lambda p \delta$.

For example, suppose the current state is $S_{x,y}$. With probability $\mu\delta$, a new plaintext is encrypted. Hence the process transits to $S_{x,y+1}$ from $S_{x,y}$. A similar analysis can be conducted for other situations. The stationary probability $\pi$ can be found: With probability $\lambda(1-p)\delta$, a new encryption key is updated based on a bad quality raw key, hence the state is changed to be $S_{x+1,y}$. With probability $\lambda p \delta$, a good quality key is generated, hence the state is changed to be $S^*$. Otherwise, the state is unchanged. Note that if the current state is $S^*$, the new encryption key becomes the latest encryption key unknown to Eve. Then we can have a similar analysis for the transition probability of $S^*$.

$$\forall x > 1, \pi(S_{x,y}) = \binom{x+y-1}{y}\frac{(\lambda-\lambda p)^{x-1}\mu^y}{(\mu+\lambda)^{x+y}}\lambda p$$

$$\forall x = 1, y > 0, \pi(S_{1,y}) = \frac{\mu^y}{(\mu+\lambda)^{1+y}}\lambda p$$

$$\pi(S_{1,0}) = \frac{1}{\mu+\lambda}\lambda p - \lambda p \delta$$

$$\pi(S^*) = \lambda p \delta.$$

Consider a path t in the Markov chain starting from $S_{0,0}$ with D steps. Denote $n(x,y)$ by the number of times that $S_{x,y}$ transits to $S^*$ in the path $\Phi$. Denote $n^*$ by the number of times that $S^*$ transits to $S^*$ itself in $\Phi$. Then we have $$\sum_{i=1}^{m}\mathbb{1}_{c_i > R} = \sum_{y=R+1}^{\infty}\sum_{x=1}^{\infty} n(x,y)x$$

where m is the number of encryption keys generated before the last raw key that is unknown to the eavesdropper of time interval $[0, D\delta]$: $m = n^* + \sum_{y=0}^{\infty}\sum_{x=1}^{\infty} n(x,y)x$.

Since the Markov chain has a stationary distribution, by the ergodic theorem[17], we have $$\lim_{D \to \infty} \frac{\sum_{y=R+1}^{\infty}\sum_{x=1}^{\infty} n(x,y)x}{D}$$

$$= \sum_{y=R+1}^{\infty}\sum_{x=1}^{\infty} \mathbb{P}\{S^* | S_{x,y}\}\pi(S_{x,y}) \cdot x$$

$$= \sum_{y=R+1}^{\infty}\sum_{x=1}^{\infty} \binom{x+y-1}{y}\frac{(\lambda-\lambda p)^{x-1}\mu^y}{(\mu+\lambda)^{x+y}}\lambda^2 p^2 \delta x$$

$$= \sum_{y=R+1}^{\infty}\frac{\lambda^2 p^2 \delta \cdot \mu^y}{(\mu+\lambda)^{y+1}}\sum_{x=0}^{\infty}\binom{x+y}{x}\left(\frac{\lambda-\lambda p}{\mu+\lambda}\right)^x (x+1)$$

$$= \lambda\delta\left(\frac{\mu}{\mu+\lambda p}\right)^{R+1}\left(1 + (1-p)(R+1)\frac{\lambda p}{\lambda p + \mu}\right).$$

where the last step uses: $\Sigma_{x=0}^{\infty}\binom{x+Y}{x}t^x(x+1) = (1-t+(y+1)t)(1-t)^{-(y+2)}$ and $$\sum_{y=R+1}^{\infty} t^y(y+1) = t^{R+1}\frac{1}{1-t}\left(R+2+\frac{t}{1-t}\right).$$

$$\sum_{x=0}^{\infty}\binom{x+y}{x}t^x(x+1) = (1-t+(y+1)t)(1-t)^{-(y+2)}$$

$$\sum_{y=R+1}^{\infty} t^y(y+1) = t^{R+1}\frac{1}{1-t}\left(R+2+\frac{t}{1-t}\right).$$

Similarly, we can get $$\lim_{D \to \infty} \frac{n^* + \sum_{y=0}^{\infty}\sum_{x=1}^{\infty} n(x,y)x}{D} = \lambda^2 p^2 \delta^2 + \lambda\delta.$$

Hence, $$\lim_{m \to \infty} \frac{\sum_{i=1}^{m}\mathbb{1}_{c_i > R}}{m}$$

$$= \lim_{D \to \infty, \delta \to 0} \frac{\sum_{y=R+1}^{\infty}\sum_{x=1}^{\infty} n(x,y)x}{n^* + \sum_{y=0}^{\infty}\sum_{x=1}^{\infty} n(x,y)x}$$

$$= \left(\frac{\mu}{\mu+\lambda p}\right)^{R+1}\left(1 + (1-p)(R+1)\frac{\lambda p}{\lambda p + \mu}\right),$$

which completes the proof

What is claimed is:

1. A method of sending an electronic communication from a sender to a receiver through a reciprocal communication channel, the method comprising:
   correlating phase-related channel state information between the sender and the receiver, thereby producing correlated phase-related channel state information that is substantially equal at the sender and receiver, wherein correlated phase-related channel state information is independent of a phase offset $\lambda_b$ in a signal carrying the electronic message, the offset associated with a delay of detecting the signal, a sampling frequency offset $\lambda_O$; and a frequency offset $\beta$ of a central frequency of the communication channel;
   generating an encryption key using the correlated phase-related channel state information, including identifying a previous encryption key, generating an update term using the correlated phase-related channel state information, and combining the previous encryption key with the update term, thereby generating the encryption key; and
   encrypting the electronic communication using the encryption key and an encryption protocol.

2. The method of claim 1 wherein the correlated phase-related channel information is substantially different from the phase-related channel information.

3. The method of claim 2 wherein the correlated phase-related channel information includes a relative phase of a signal used to transmit the electronic communication.

4. The method of claim 1 wherein producing correlated phase-related channel state information further comprises:
   identifying uncorrelated channel state information;
   identifying a linear term in the uncorrelated channel state information with slope $\lambda_b + \lambda_o$ and intercept $\beta + \angle \overline{h}$, where $\angle \overline{h}$ denotes a mean phase of ideal channel state information over a set of subcarriers; and
   subtracting the linear term from the uncorrelated channel state information, thereby producing correlated phase-related channel state information.

5. The method of claim 4, in which the uncorrelated phase-related channel state information h associated with a frequency $f_k$ is given by $$h(f_k) = \sum_{l=1} \alpha_l e^{-j2\pi f_k \tau_l}$$

where $\alpha_l$ and $\tau_l$ denote the amplitude and delay of an $l^{th}$ path, respectively, and $j^2 = -1$.

6. The method of claim 1, wherein combining the previous encryption key with the update term includes computing the XOR sum of the previous encryption key with the update term.

7. The method of claim 1, wherein combining the previous encryption key with the update term accomplished by a mathematically unstable operation on the previous encryption key and the update term.

8. The method of claim 1, wherein sequentially combining the previous encryption key with the update term results in an outage probability that is an exponentially decreasing function of a number of compromised transmissions.

9. The method of claim 1, wherein correlating the phase-related channel state information includes converting an analog signal to a digital signal having n possible values, where n is selected based on a performance metric.

10. The method of claim 9, wherein the performance metric includes a minimum key generation rate.

11. The method of claim 9, wherein the performance metric includes a maximum key disagreement rate.

\* \* \* \* \*